US008746703B2

(12) United States Patent
Xu et al.

(10) Patent No.: US 8,746,703 B2
(45) Date of Patent: Jun. 10, 2014

(54) SCREWDRIVER HEAD MOUNTING STRUCTURE

(75) Inventors: Xiao-Bing Xu, Shenzhen (CN); Qing-Song Wen, Shenzhen (CN); Hai-Feng Ma, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 251 days.

(21) Appl. No.: 13/185,661

(22) Filed: Jul. 19, 2011

(65) Prior Publication Data

US 2012/0139194 A1 Jun. 7, 2012

(30) Foreign Application Priority Data

Dec. 3, 2010 (CN) .......................... 2010 1 0572350

(51) Int. Cl.
*B23B 31/107* (2006.01)

(52) U.S. Cl.
USPC .................. 279/97; 279/76; 279/904; 279/86

(58) Field of Classification Search
USPC ........................ 279/97, 86, 76, 77, 19.5, 904; 408/239 R, 238; 403/324, 327, 325, 403/378, 379.5
See application file for complete search history.

(56) References Cited

U.S. PATENT DOCUMENTS 302,519 A * 7/1884 Parsons ........................... 278/65
771,626 A * 10/1904 Gilman ........................... 279/97
1,182,934 A * 5/1916 Scott ........................... 279/19.5
1,462,702 A * 7/1923 Johnson ........................... 81/32
1,809,553 A * 6/1931 Graul ........................... 279/89
1,809,823 A * 6/1931 Altvater ........................... 279/97
1,833,236 A * 11/1931 Smith ........................... 279/19.5
2,448,278 A * 8/1948 Ronning ........................... 192/71
2,885,231 A * 5/1959 Smith ........................... 403/327
3,726,533 A * 4/1973 Lafferty, Sr. ........................... 279/97
4,146,240 A * 3/1979 Nielsen ........................... 279/19.5
4,185,935 A * 1/1980 Bierlein ........................... 403/14
4,284,284 A * 8/1981 Sides ........................... 279/19.5
4,402,519 A * 9/1983 Meaden et al. ........................... 279/76
4,588,335 A * 5/1986 Pearson, Jr. ........................... 408/239 R
4,645,368 A * 2/1987 Simpson et al. ........................... 403/9
4,688,459 A * 8/1987 Osborn et al. ........................... 83/698.31
4,710,075 A * 12/1987 Davison ........................... 408/202
4,809,995 A * 3/1989 Ramunas ........................... 279/77
5,011,344 A * 4/1991 Johnson ........................... 408/240

(Continued)

FOREIGN PATENT DOCUMENTS

CN 2740356 Y 11/2005
CN 201659551 U 12/2010

*Primary Examiner* — Eric A Gates
*Assistant Examiner* — Paul M Janeski
(74) *Attorney, Agent, or Firm* — Novak Druce Connolly Bove + Quigg LLP

(57) ABSTRACT

A screwdriver head mounting structure includes a mounting base, a screwdriver head, a latching member and an elastic member. The mounting base defines a mounting hole and an eccentric latching hole communicating with and positioned eccentric to the mounting hole. The screwdriver head is detachably assembled to the mounting base. The screwdriver head has a latching end inserted into the mounting hole of the mounting base. The latching member is releasably and adjustably assembled to the mounting base together with the elastic member. The latching member passes through the eccentric latching hole and latches with the latching end of the screwdriver head.

11 Claims, 5 Drawing Sheets

(56) References Cited

U.S. PATENT DOCUMENTS

| | | | | |
|---|---|---|---|---|
| 5,033,920 | A * | 7/1991 | Cantanese | 408/239 R |
| 5,193,419 | A * | 3/1993 | Lee | 81/177.2 |
| 5,690,445 | A * | 11/1997 | Wu | 403/306 |
| 6,554,292 | B1 * | 4/2003 | Rohm | 279/137 |
| 7,172,377 | B2 * | 2/2007 | McFarlin et al. | 409/234 |
| 7,506,877 | B1 * | 3/2009 | Henderson et al. | 279/76 |
| 7,762,117 | B2 * | 7/2010 | Faucher et al. | 72/482.92 |
| 7,934,893 | B2 * | 5/2011 | Gillissen | 408/68 |
| 8,308,403 | B2 * | 11/2012 | Hecht | 408/239 R |
| 2011/0255931 | A1 * | 10/2011 | Murdie et al. | 408/204 |

* cited by examiner

SCREWDRIVER HEAD MOUNTING STRUCTURE

BACKGROUND

1. Technical Field

This disclosure relates to tool mounting structures, and particularly, to a screwdriver head mounting structure.

2. Description of Related Art

Presently, screwdrivers are widely applied in many industrial assembling or disassembling processes, to assemble screws to a product or detach the screws from the product. The typical screwdriver includes a screwdriver head, a screwdriver head mounting structure for mounting the screwdriver head, and a drive. However, the typical screwdriver head mounting structure has a flexible structure with low locating accuracy.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the screwdriver head mounting structure. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
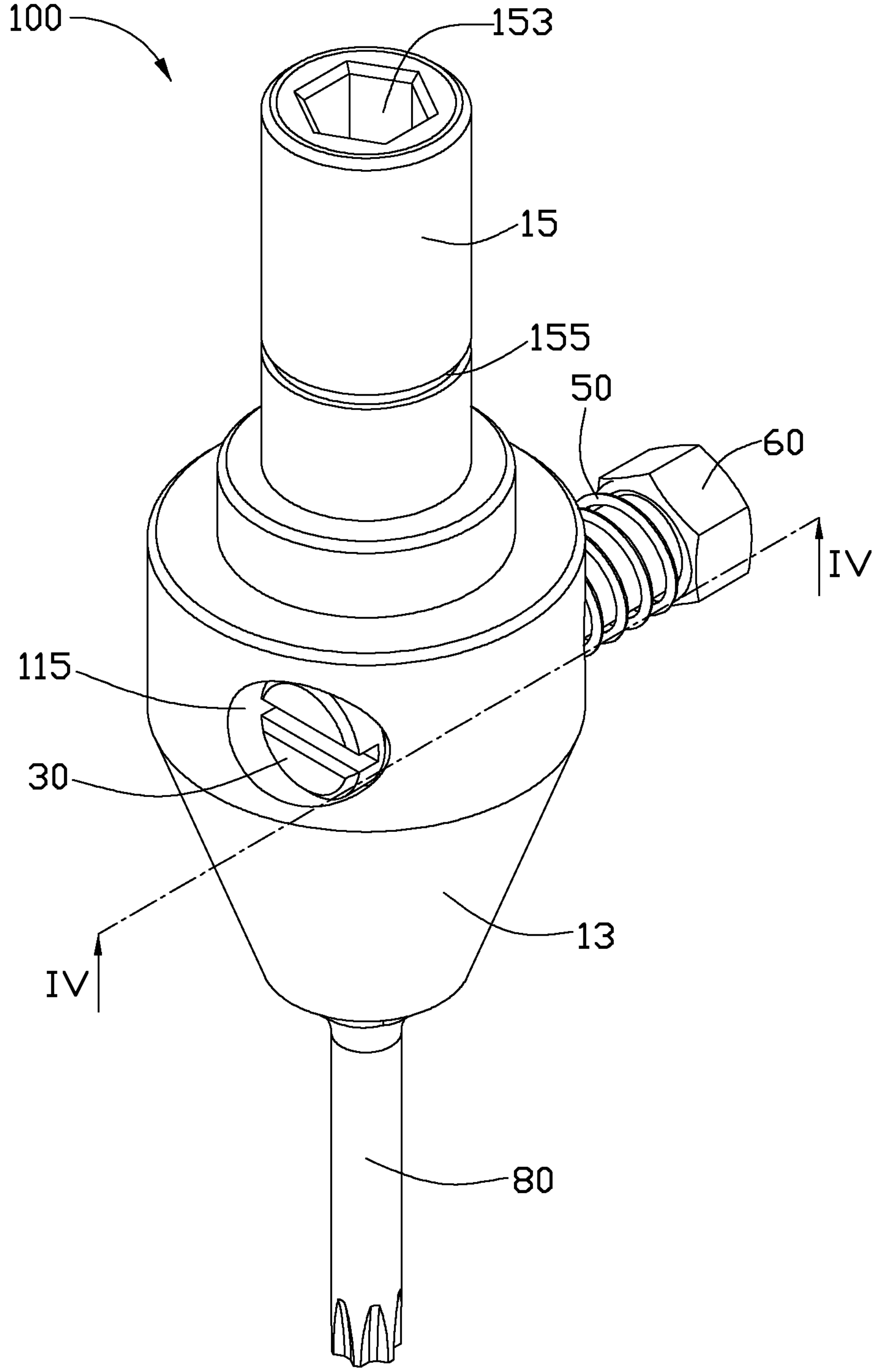
FIG. 1 is an assembled isometric view of an embodiment of a screwdriver head mounting structure.
Figure 2:
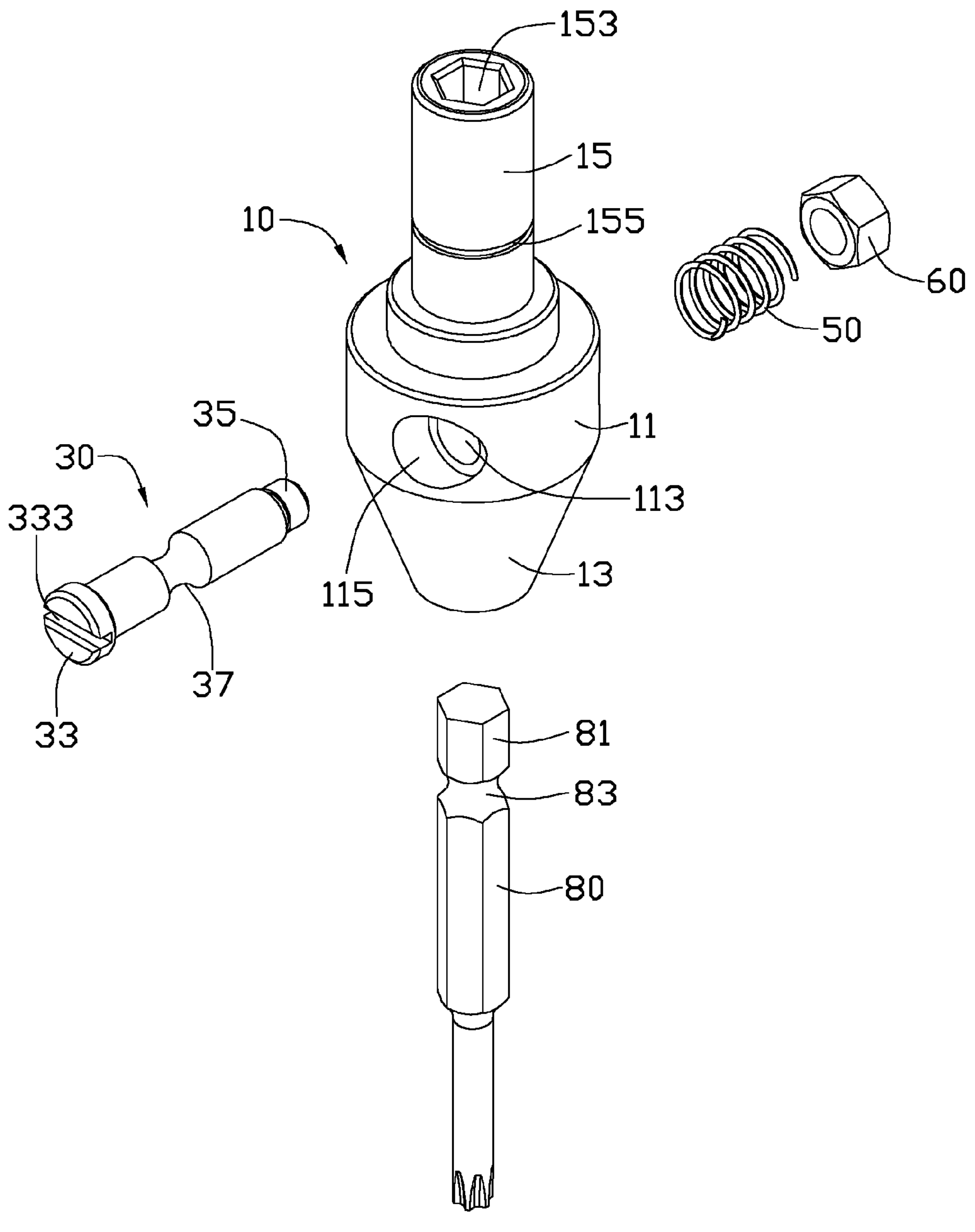
FIG. 2 is an exploded isometric view of the screwdriver head mounting structure of FIG. 1.
Figure 3:
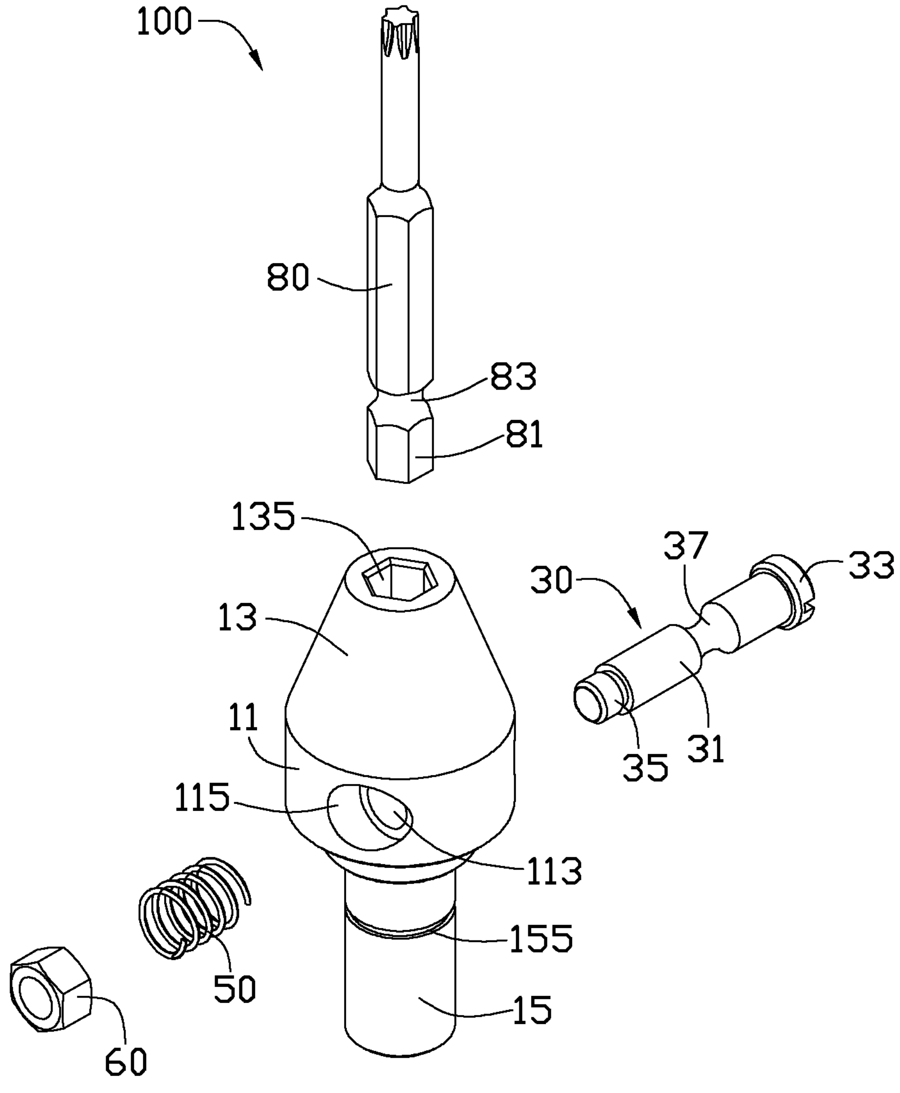
FIG. 3 is similar to FIG. 2, but viewed from another aspect.

Referring to FIGS. 1 through 3, an embodiment of a screwdriver head mounting structure 100 is shown. The screwdriver head mounting structure 100 includes a mounting base 10, a latching member 30, an elastic member 50, a fixing member 60, and a screwdriver head 80. The latching member 30 is detachably assembled to the mounting base 10 via the elastic member 50 and the fixing member 60.

The mounting base 10 includes a substantially cylindrical main body 11, an assembly portion 13 coaxially formed on one end of the main body 11, and a fixing portion 15 formed on the opposite other end of the main body 11, coaxially. In the illustrated embodiment, the main body 11 is a substantially stepped cylinder, and defines an eccentric latching hole 113 through a peripheral side wall of the main body 11, along a direction perpendicular to and eccentric to a rotary axis of the main body 11. The side walls of the main body 11 adjacent to two ends of the eccentric latching hole 113 are recessed along a radial direction of the eccentric latching hole 113, thereby forming two coaxial cylindrical receiving portions 115, respectively. The two receiving portions 115 each has a diameter slightly greater than that of the central portion of the eccentric latching hole 113.

The assembly portion 13 is substantially cone shaped, and coaxially extends from one end of the main body 11. A diameter of the assembly portion 13 decreases along a direction away from the main body 11. A mounting hole 135 is defined in a distal end surface of the assembly portion 13 toward the main body 11, and partially intersects with the eccentric latching hole 113. In the illustrated embodiment, the mounting hole 135 is a hexagonal hole. It is to be understood that, the mounting hole 135 can also be other non-circular hole. The mounting hole 135 extends from a distal end of the assembly portion 13 to the substantially distal end portion of the main body 11 away from the assembly portion 13.

The fixing portion 15 is substantially cylindrical and coaxially formed on the opposite other end of the main body 11 and positioned away from the assembling portion 13. An assembly hole 153 is recessed from the distal end surface of the fixing portion 15 toward the main body 11, for facilitating the mounting base 10 to be connected to an electric driver or an assisting rotation rod of a screwdriver. A ring-shaped mounting slot 155 is recessed from an outer side surface of the fixing portion 15 and positioned adjacent to the main body 11.

The latching member 30 passes through the eccentric latching hole 113 of the mounting base 10, and is detachably mounted to the mounting base 10 by the elastic member 50 and the fixing member 60. In the illustrated embodiment, the latching member 30 is a latching pin including a pin body 31, a head portion 33 formed at one end of the pin body 31, and a fixing end 35 formed at the opposite other end of the pin body 31. The pin body 31 has a shaft diameter substantially the same as that of the eccentric latching hole 113 of the mounting base 10. A latching slot 37 is recessed from a substantially middle portion of a peripheral side wall of the pin body 31. The head portion 33 is substantially disc shaped, and has a dimension substantially the same as that of the receiving portion 115 of the main body 11, such that, when the latching member 30 is mounted to the mounting base 10, the head portion 33 is recessed within the receiving portion 115 of the main body 11. An adjusting slot 333 is defined in a distal end surface of the head portion 33 away from the pin body 31, for adjusting the latching member 30. The fixing end 35 is an outer threaded end in the illustrated embodiment.

The elastic member 50 is a coil spring in the illustrated embodiment, and is sleeved on the pin body 31 of the latching member 30 to provide an elastic resisting force to the latching member 30 during usage.

The fixing member 60 is a nut in the illustrated embodiment, and is secured to the fixing end 35 of the latching member 30.

The screwdriver head 80 is detachably mounted and latched to the mounting base 10 by the latching member 30. In the illustrated embodiment, the screwdriver head 80 has a latching end 81. A ring shaped holding slot 83 is defined in an outer side wall of the latching end 81. A width of the holding slot 83 is substantially the same as the shaft diameter of the pin body 31 of the latching member 30.

Figure 4:
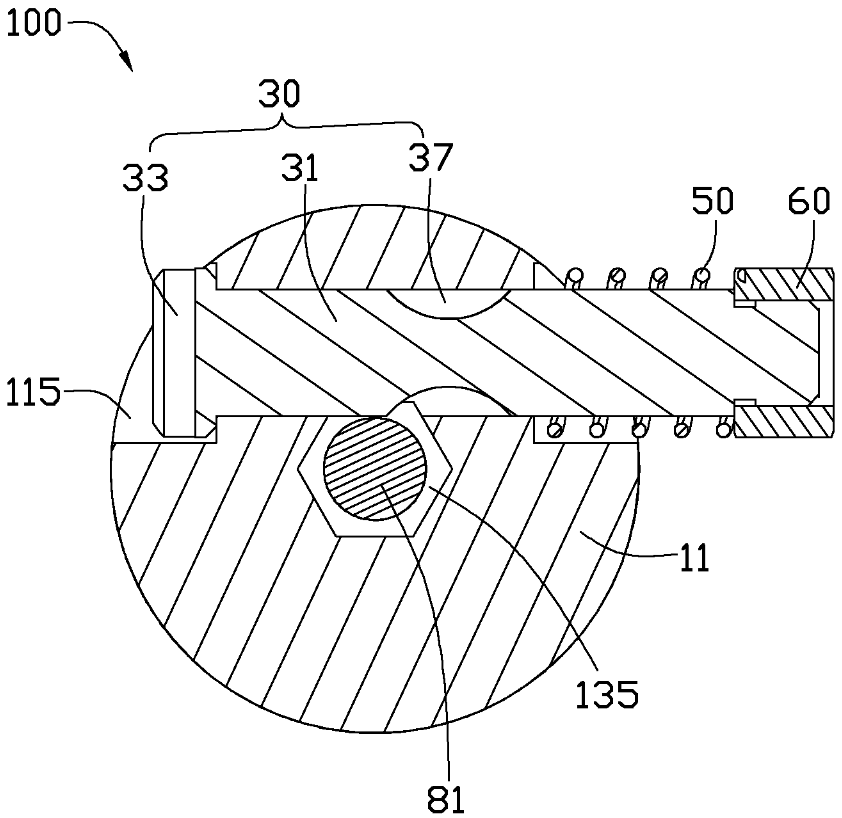
FIG. 4 is a cross-section of the screwdriver head mounting structure of FIG. 1, taken along line IV-IV.
Figure 5:
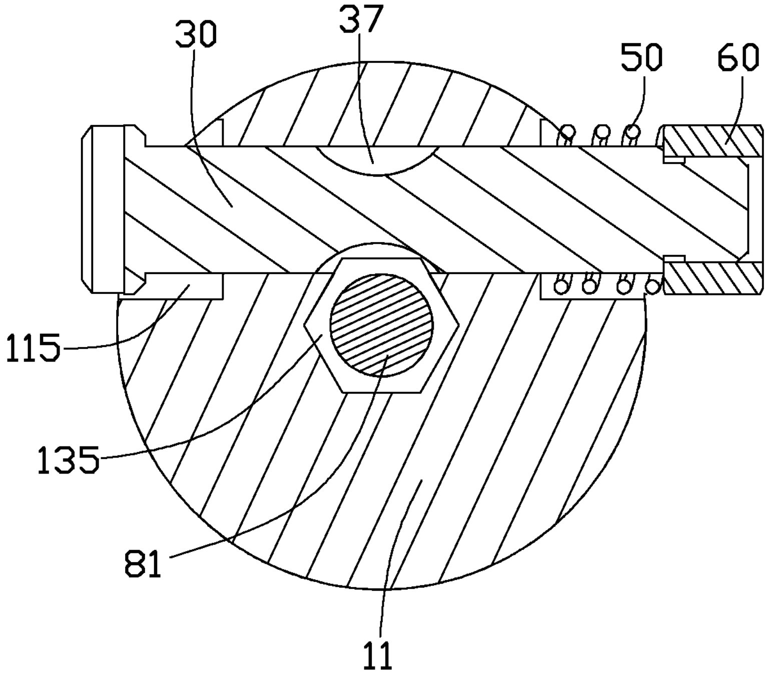
FIG. 5 is similar to FIG. 4, but showing another cross-section of the screwdriver head mounting structure in an unlock state.

Also referring to FIGS. 4 and 5, when assembling the screwdriver head mounting structure 100, the fixing end 35 of the latching member 30 aligns with and passes through one end of the eccentric latching hole 113 of the mounting base 10, and is exposed from the other end of the eccentric latching hole 113 of the mounting base 10. The head portion 33 of the latching member 30 is received within one corresponding receiving portion 115 of the eccentric latching hole 113. The elastic member 50 is sleeved on the pin body 31 from the fixing end 35 of the latching member 30, and is partially received within the other receiving portion 115 of the eccentric latching hole 113. The fixing member 60 is securely fixed to the fixing end 35 of the latching member 30. The elastic member 50 is then elastically sleeved on the pin body 31, and sandwiched between the main body 11 and the fixing member 60, thereby providing a continuing elastic resisting force to the latching member 30, during usage. Thus, the latching member 30 is adjustably mounted to the mounting base 10. The latching slot 37 of the latching member 30 is positioned adjacent to and partially aligns or communicates with the mounting hole 135 of the mounting base 10.

When assembling the screwdriver head 80, the latching end 81 of the screwdriver head 80 aligns with and is inserted into the mounting hole 135 of the mounting base 10. Then, applying an outer force to the fixing member 60 to push the latching member 30 toward the head portion 33 direction, until the latching slot 37 of the latching member 30 aligns with the mounting hole 135 of the mounting base 10 completely. The screwdriver head 80 is further pushed toward the fixing portion 15 of the mounting base 10, until the latching end 81 runs across the latching slot 37 of the latching member 30, and the holding slot 83 of the screwdriver head 80 aligns and intersects with the latching slot 37 of the latching member 30. Finally, the latching member 30 is released and runs back to its original position, and the pin body 31 of the latching member 30 engages and latches into the holding slot 83 of the latching end 81 of the screwdriver head 80, thereby holding and preventing the screwdriver head 80 from departing from the mounting base 10, to finish the assembly of the screwdriver head mounting structure 100.

To detach or replace the screwdriver head 80, an outer force needs to be applied to the fixing end 35 of the latching member 30 toward the head portion 33, thereby pushing and releasing the latching member 30, until the latching slot 37 of the latching member 30 aligns and intersects with the mounting hole 135 of the mounting base 10; then, the screwdriver head 80 can be directly taken out.

The screwdriver head mounting structure 100 has a simple structure, and the screwdriver head 80 can be assembled or detached quickly during usage. The screwdriver head 80 can be firmly assembled to mounting base 10 by means of the latching member 30, thereby preventing the screwdriver head 80 from detaching from the mounting base 10 accidently during usage. Thus, the screwdriver head mounting structure 100 has a much improved safety performance.

It is to be understood, however, that even through numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A screwdriver head mounting structure, comprising:

a mounting base comprising a main body and an assembly portion coaxially formed on one end of the main body, a mounting hole defined in the assembly portion toward the main body, and an eccentric latching hole defined through a peripheral sidewall of the main body, the latching hole communicating with and positioned eccentric to the mounting hole;

a screwdriver head having a latching end inserted into the mounting hole of the mounting base;

an elastic member; and a latching member detachably assembled to the mounting base together with the elastic member, the latching member comprising a pin body, a head portion formed at one end of the pin body, and a fixing end formed at the opposite other end of the pin body, the pin body defining a latching slot; and a fixing member detachably fixed to the fixing end of the latching member; wherein the fixing end of the latching member passes through the eccentric latching hole, the pin body is received in the eccentric latching hole, the elastic member is sleeved on the fixing end, opposite ends of the elastic member resist the fixing member and the main body of the mounting base, respectively, such that the latching slot and the elastic member are located at a same side of the mounting hole adjacent to the fixing member, the head portion directly resists the main body, and the latching end of the screwdriver head is latched in the mounting hole; when the elastic member is compressed, the latching member moves toward the mounting hole, and the latching slot aligns with the mounting hole, and the latching end is detached from the mounting hole.

2. The screwdriver head mounting structure as claimed in claim 1, wherein the latching end of the screwdriver head defines a holding slot; the latching member is a latching pin assembled within the eccentric latching hole and latched with the holding slot of the screwdriver head.

3. The screwdriver head mounting structure as claimed in claim 2, wherein a width of the holding slot is substantially the same as a shaft diameter of the latching member.

4. The screwdriver head mounting structure as claimed in claim 1, wherein the sidewall of the main body adjacent to two ends of the eccentric latching hole are recessed along a radial direction of the eccentric latching hole, thereby forming two coaxial cylindrical receiving portions, respectively; the head portion of the latching member is received within one corresponding receiving portion of the eccentric latching hole, the elastic member is partially received within the other receiving portion of the eccentric latching hole.

5. The screwdriver head mounting structure as claimed in claim 1, wherein the head portion is substantially disc shaped, and defines an adjusting slot in a distal end surface thereof, away from the pin body.

6. The screwdriver head mounting structure as claimed in claim 1, wherein the eccentric latching hole is defined along a direction perpendicular to and eccentric to an axis of the main body; the mounting hole partially intersects with the eccentric latching hole.

7. The screwdriver head mounting structure as claimed in claim 6, wherein the mounting hole extends from a distal end of the assembly portion to the substantially distal end portion of the main body away from the assembly portion.

8. The screwdriver head mounting structure as claimed in claim 7, wherein the mounting base further comprises a fixing portion coaxially formed on the opposite other end of the main body, and positioned away from the assembling portion; the fixing portion defines an assembly hole in a distal end surface thereof and a ring-shaped mounting slot recessed from an outer periphery thereof.

9. A screwdriver head mounting structure, comprising:

a mounting base comprising a main body and an assembly portion coaxially formed on one end of the main body; the assembly portion defining a mounting hole axially extending to the main body; the main body defining an eccentric latching hole through a peripheral wall thereof, along a direction perpendicular to and eccentric to an axis of the main body; the eccentric latching hole partially intersecting with the mounting hole;

an elastic member;

a latching member adjustably assembled into the eccentric latching hole of the mounting base, the latching member comprising a pin body, a head portion formed at one end of the pin body, and a fixing end formed at the opposite other end of the pin body, the pin body defining a latching slot;

a fixing member detachably fixed to the fixing end of the latching member; and a screwdriver head having a latching end inserted into the mounting hole of the mounting base, and latched with the latching member, wherein the fixing end of the latching member passes through the eccentric latching hole, the pin body is received in the eccentric latching hole, the elastic member is sleeved on the fixing end, opposite ends of the elastic member resist the fixing member and the main body of the mounting base, respectively, such that the latching slot and the spring are located at a same side of the mounting hole adjacent to the fixing member, the head portion resists the main body, and the latching end of the screwdriver head is latched in the mounting hole; when the elastic member is compressed, the latching member moves toward the mounting hole, and the latching slot aligns with the mounting hole, and the latching end is detached from the mounting hole.

10. The screwdriver head mounting structure as claimed in claim 9, wherein the latching end of the screwdriver head defines a holding slot corresponding to the latching slot.

11. The screwdriver head mounting structure as claimed in claim 9, wherein the mounting base further comprises a fixing portion coaxially formed on the opposite other end of the main body, and positioned away from the assembling portion; the fixing portion defines an assembly hole in a distal end surface thereof.

* * * * *